US008213903B2

(12) United States Patent
Pudney et al.

(10) Patent No.: US 8,213,903 B2
(45) Date of Patent: Jul. 3, 2012

(54) TELECOMMUNICATIONS NETWORKS

(75) Inventors: Christopher David Pudney, Newbury (GB); David Andrew Fox, Reading (GB); Peter Howard, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 870 days.

(21) Appl. No.: 11/912,869

(22) PCT Filed: Apr. 26, 2006

(86) PCT No.: PCT/GB2006/001536
§ 371 (c)(1),
(2), (4) Date: Oct. 22, 2008

(87) PCT Pub. No.: WO2006/114628
PCT Pub. Date: Nov. 2, 2006

(65) Prior Publication Data
US 2009/0067628 A1    Mar. 12, 2009

(30) Foreign Application Priority Data

Apr. 26, 2005  (GB) .................................. 0508464.5
Jan. 10, 2006  (GB) .................................. 0600400.6

(51) Int. Cl.
*H04M 1/66* (2006.01)
(52) U.S. Cl. ...................... 455/411; 455/410; 455/414.1; 455/432.1; 455/435.1; 455/452.2; 370/389; 370/352; 370/328; 380/247; 380/248; 380/249; 380/250
(58) Field of Classification Search .................. 455/411, 455/410, 414.1, 432.1, 435.1, 452.2; 370/389, 370/352, 328; 380/247, 248, 249, 250
See application file for complete search history.

(56) References Cited

U.S. PATENT DOCUMENTS
2002/0068545 A1    6/2002 Johnson et al.
(Continued)

FOREIGN PATENT DOCUMENTS
WO          02/085050          10/2002

OTHER PUBLICATIONS

Magnusson P. et al: "Radio resource management distribution in a beyond 3G multi-radio access architecture," Global Telecommunications Conference, 2004. Globecom '04. IEEE Dallas, TX, USA, Nov. 29-Dec. 3, 2004, Piscataway, NJ, USA, IEEE, vol. 6, Nov. 29, 2004, pp. 3472-3477, XP010758382.

(Continued)

*Primary Examiner* — Danh Le
*Assistant Examiner* — Khai M Nguyen
(74) *Attorney, Agent, or Firm* — Workman Nydegger

(57) ABSTRACT

A mobile telecommunications network and method of operation that includes establishing a first user plane connection between a telecommunications device registered with the network and a network gateway device of the network via a first access point; providing the telecommunications device with a token using the first user plane connection; establishing a second user plane connection between the telecommunications device and the network gateway device via a second access point by using the token information to validate the telecommunications device; and, subsequent to establishment of and corresponding to the second user plane connection, establishing a control plane connection between the telecommunications device and the network gateway device via the second access point. The token includes information indicative to the network that the telecommunications device has authorization to send a quantity of data to the network gateway device prior to full conventional authentication of the telecommunications device.

10 Claims, 4 Drawing Sheets

U.S. PATENT DOCUMENTS

| | | | | |
|---|---|---|---|---|
| 2002/0150092 | A1* | 10/2002 | Bontempi et al. | 370/389 |
| 2006/0063534 | A1* | 3/2006 | Kokkonen et al. | 455/456.1 |
| 2007/0184854 | A1* | 8/2007 | Niemenmaa et al. | 455/456.1 |
| 2009/0204807 | A1* | 8/2009 | Bolin et al. | 713/155 |
| 2009/0213794 | A1* | 8/2009 | Rotsten et al. | 370/328 |
| 2011/0110295 | A1* | 5/2011 | Parolari | 370/328 |

OTHER PUBLICATIONS

Pudney, Chris, Vodafone: "Concept for Evolvod 3GPP Architecture, Tdoc S2-051289," 3GPP TSG-SA WG2 #46, Joint SAN 2-RAN 2-RAN 3, Athens, Greece, May 9, 2005, p. 15, XP002391758.

* cited by examiner

TELECOMMUNICATIONS NETWORKS

BACKGROUND TO THE INVENTION

The present invention relates to telecommunications networks, and more particularly, but not exclusively, to developments in such networks suitable for adoption in 3GPP SAE/LTE or 4$^{th}$ generation (4G) mobile or cellular telecommunications networks that will be implemented in the future.

The operation and architecture of 2G (GSM), 2.5G (GPRS) and 3G (UMTS) mobile or cellular communications networks are generally well known and will not be described in detail herein. The relevant Standards Specifications are incorporated herein by reference. It is anticipated that SAE/LTE and 4G networks may provide the following advantages, compared to these known networks:
1. Support interactive multimedia services: teleconferencing, wireless Internet, etc.
2. Wider bandwidths, higher bit rates.
3. Global mobility and service portability.
4. Scalability of mobile networks.

and may be/have:

5. Entirely packet-switched networks.
6. All network elements are digital.
7. Higher bandwidths to provide multimedia services at lower cost.
8. Tight network security.

BRIEF SUMMARY OF THE INVENTION

According to a first aspect of the present invention, there is provided a mobile telecommunications network including a radio access network comprising a plurality of access points, a plurality of network gateway devices, a network core, wherein a plurality of mobile telecommunications devices are registered with the network and communicate with the network core wirelessly via the radio access network and via one of said network gateway devices, characterised in that the network is arranged to allow a communication received from a mobile telecommunication device by an access point to be potentially routed to the network core via any one of a plurality of said network gateway devices, and further characterised by including means for selecting one of said plurality of network gateway devices for routing said communication.

According to a second aspect of the present invention, there is provided a telecommunications network including a plurality of access points, a plurality of network gateway devices, and a network core, wherein a plurality of telecommunications devices are registered with the network and communicate with the network core via respective access points and via one of said network gateway devices, characterised in that the network is arranged to allow data packets from a telecommunications device to be received by a plurality of access points, and characterised by further comprising combining means for receiving the data packets from each of the said plurality of access points, such that the combining means may receive corresponding data packets from a plurality of said plurality of access points, the combining means being operable to select one of any corresponding data packets and to transmit the selected data packet to the network gateway for onward transmission to the network core.

According to a third aspect of the present invention, there is provided a mobile telecommunications network including a plurality of access points, a plurality of network gateway devices, and a network core, wherein a plurality of telecommunications devices are registered with the network and communicate within the network core via the access points and the network gateway devices, characterised in that the network is operable to establish a user plane connection between one of the telecommunications devices and one of the network gateways, and is operable to subsequently establish a control plane connection.

According to a fourth aspect of the present invention, there is provided a telecommunications network including a plurality of access points, a plurality of network gateway devices, and a network core, wherein a plurality of telecommunications devices are registered with the network and communicate with the network core via the access points and via the network gateway devices, characterised in that at least one of said access points is provided with authentication means for authenticating that access point with the network core.

According to a fifth aspect of the invention, there is provided a telecommunications network including a plurality of access points and a network core, wherein a plurality of telecommunications devices are registered with the network and communicate with the network core via the access points, characterised in that an authentication procedure between one of the devices and the network core generates a master cipher key which is used to derive cryptographically separate keys for a plurality of ciphered links between the device and the network core.

The invention also relates to the methods of operating a telecommunications network disclosed, and to the elements of a telecommunications network disclosed, including telecommunications devices.

BRIEF DESCRIPTION OF THE DRAWINGS

For a better understanding of the present invention embodiments will now be described by way of example with reference to the accompanying drawings in which.

In the drawings like elements are generally designated with the same reference numeral.

DETAILED DESCRIPTION OF EMBODIMENTS

Overview of 3G Network

Figure 1:
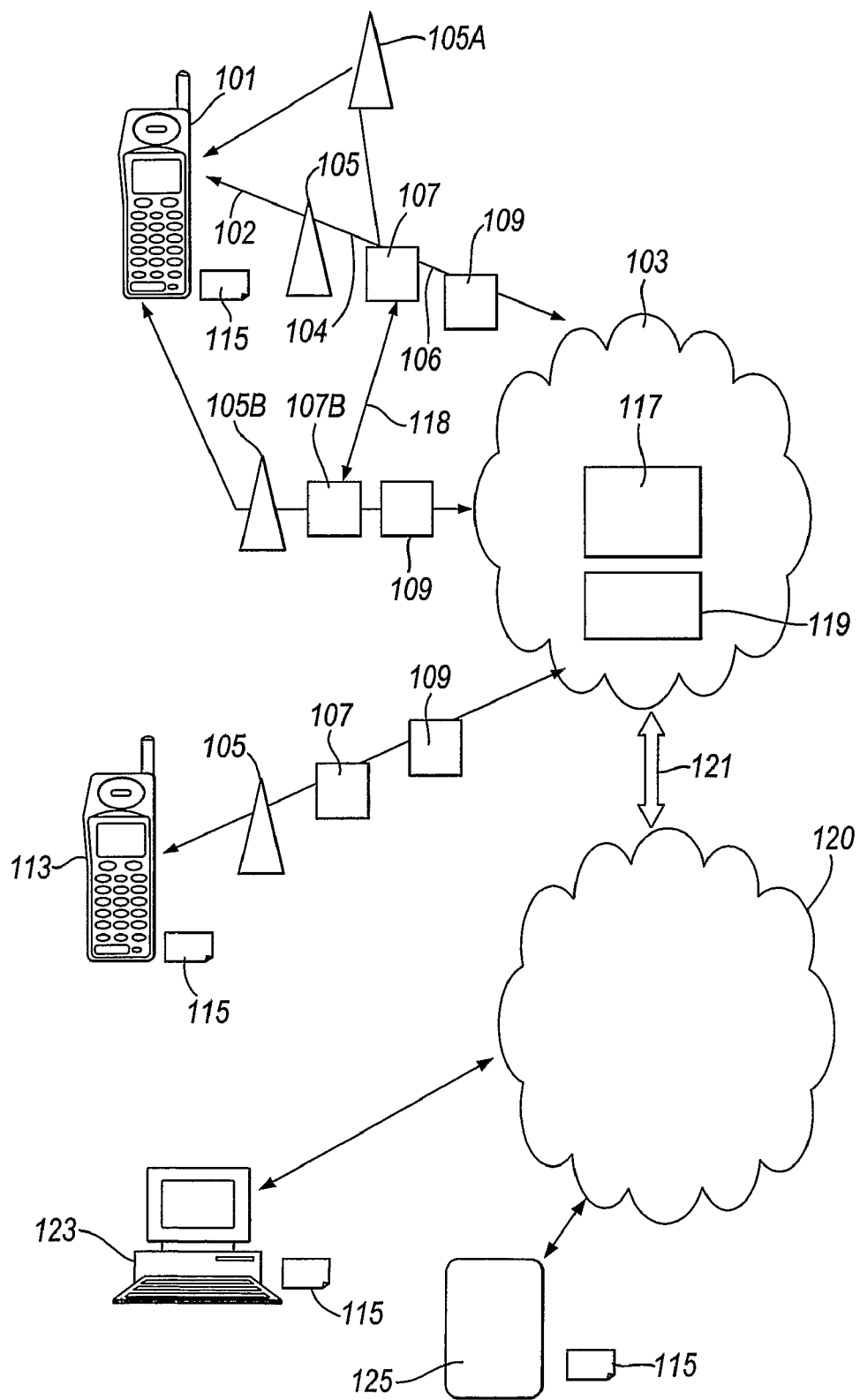
FIG. 1 shows the elements of a known 3G network.

FIG. 1 shows a 3G cellular network. Mobile terminal 101 is registered with UMTS (3G) mobile telecommunications network 103. The mobile terminal 101 may be a handheld mobile telephone, a personal digital assistant (PDA) or a laptop computer equipped with a datacard. The mobile terminal 101 communicates wirelessly with mobile telecommunications network 103 via the radio access network (RAN) of the mobile telecommunications network 103, comprising, in the case of a UMTS network, base station (Node B) 105—via Uu Interface 102—and radio network controller (RNC) 107—via Iub Interface 104. Communications between the mobile terminal 101 and the mobile telecommunications network 103 are routed from the radio access network via serving GPRS support nodes (SGSN) 109—via Iu PS Interface 106—which may be connected by a fixed (cable) link to the mobile telecommunications network 103.

In the conventional manner, a multiplicity of other mobile terminals are registered with the mobile telecommunications network 103. These mobile terminals include mobile terminal 113. The terminal 113 communicates with the mobile telecommunications network 3 in a similar manner to the terminal 101, that is via an appropriate Node B 105, RNC 107 and SGSN 109.

The mobile telecommunications network 103 includes a gateway GPRS support node (GGSN) 117 which enables IP-based communications with other networks, such as the Internet 119 via an appropriate link 121. A multiplicity of terminals are connected to the Internet (by fixed or wireless links), and a PC terminal 123 and a PDA terminal 125 are shown by way of example.

Each of the mobile terminals 101 and 113 is provided with a respective subscriber identity module (SIM) 115. During the manufacturing process of each SIM, authentication information is stored thereon under the control of the mobile telecommunications network 103. The mobile telecommunications network 103 itself stores details of each of the SIMs issued under its control. In operation of the mobile telecommunications network 103, a terminal 101, 113 is authenticated (for example, when the user activates the terminal in the network with a view to making or receiving calls) by the network sending a challenge to the terminal 101, 113 incorporating a SIM 115, in response to which the SIM 115 calculates a reply and a key (dependent on the predetermined information held on the SIM—typically an authentication algorithm and a unique key Ki) and transmits the reply back to the mobile telecommunications network 103. The mobile telecommunications network 103 includes an authentication processor 119 which generates the challenge. Using information pre-stored concerning the content of the relevant SIM 115, the authentication processor 119 calculates the expected value of the reply from the mobile terminal 101, 113 and the key. The authentication processor 119 sends the challenge, reply and key to the SGSN 109. The SGSN 109 sends the challenge to the mobile terminal 101, 113. If the reply received by SGSN 109 matches the expected calculated reply, the SIM 115 and the associated mobile terminal are considered to be authenticated. After the authentication process has been completed, the SIM 115 and SGSN 109 share a key which can be used to protect subsequent communications.

It should be understood that such an authentication process can be performed for any terminal provided with a SIM 115 under control of the mobile telecommunications network 103. In the embodiment the terminal communicates wirelessly with the mobile telecommunications network 103 via the network's radio access network, although this is not essential. For example, the terminal may communicate with the network via the fixed telephone network (PSTN), via a UMA "access point" (AP) and/or via the Internet. The PC 23 and the PDA 125 may also be provided with a SIM 115 under the control of the network.

The SIM 115 used by the terminal 101, 113,123,125 may be a SIM or USIM of the type defined in the 2G, 2.5G or 3G standards specifications, or may be a simulation of a SIM or USIM—that is, software or hardware that performs a function corresponding to that of the SIM or USIM. The SIM may be in accordance with the arrangement described in WO-A-2004 036513.

If a USIM is used the authentication process is enhanced to provide the capability for the terminal to authenticate the network and to have assurance about the freshness of the key established as a result of the authentication process. In addition authentication using a USIM can generally be used to establish longer keys than if a SIM were used.

It should be noted that the authentication process being described does not necessarily authenticate the human identity of the user. For example, mobile telecommunication networks have pre-pay subscribers who are issued with SIMs in return for pre-payment, enabling them to use network services. However, the identity of such pre-pay subscribers may not be known by the network. Nevertheless, such a user cannot make use of the network until the network has authenticated the user's SIM—that is, has confirmed that such user is a particular user who has a particular pre-paid account with a network.

The network shown in FIG. 1 comprises both the mobile telecommunications network 103 and the Internet 120 (which itself comprises a multiplicity of other networks).

Signalling in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

Overview of SAE/LTE Network

Figure 2:
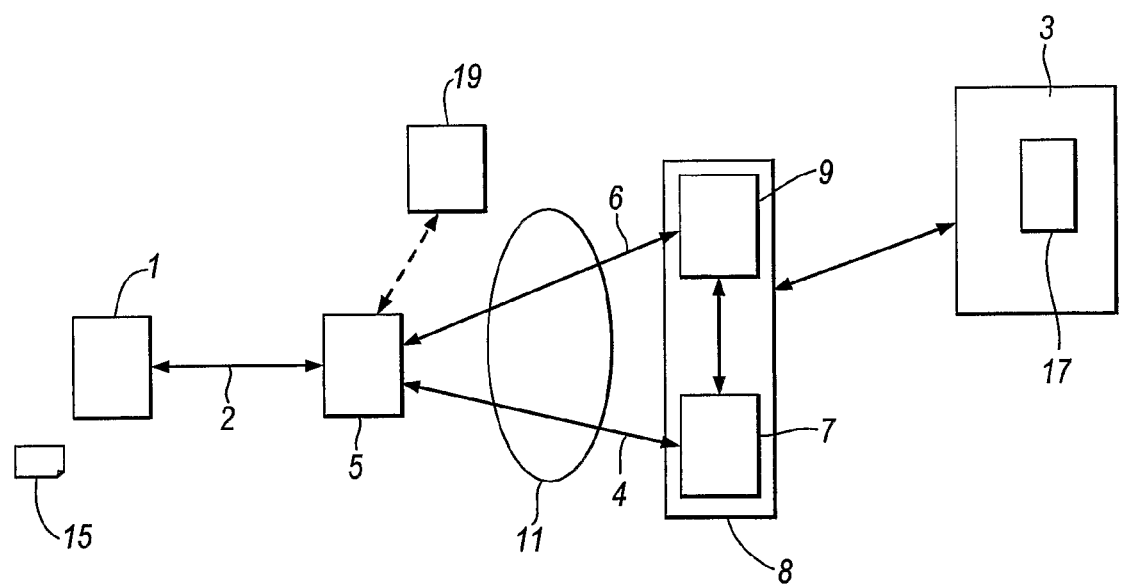
FIG. 2 shows the logical elements of a SAE/LTE network.

FIG. 2 shows schematically the logical elements of a SAE/LTE cellular telecommunications network. Mobile terminal 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises an access point (AP) or eNode 5. An eNode 5 performs functions generally similar to those performed by the nodeB 105 and the radio network controller (RNC) of a 3G network (FIG. 1). In practice there will be a multiplicity of APs/eNodeBs 5, each serving a particular area or "cells".

A mobility management entity (MME) or eSGSN 7 provides equivalent functions to the control plane functions of the SGSN 109 and GGSN 117 from the 3G architecture (Release-6). Communications between the AP/eNodeB 5 are transmitted to the MME 7 via the S1-c Interface 4.

A user plane entity (UPE) or eGGSN 9 handles the user plane traffic functions from the terminal 1 which includes the IP header and payload compression and ciphering. This node 9 provides the equivalent functions to the user plane part of the 3G RNC 107 and the user plane part of the 3G GGSN 117.

Communications between the AP/eNodeB 5 are transmitted to the UPE 7 via the S1-u Interface 6.

It should be noted that, although in FIG. 1 the MME 7 and UPE 9 are shown as separate logical entities they may exist as a single physical node of the telecommunications network in gateway aGW 8.

Data are transmitted between the AP/eNodeB and the MME 7 and UPE 9 via IP transport network 11.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated (for example, when the user activates the terminal in the network with a view to making or receiving calls) by the network sending a challenge to the terminal 1, incorporating a SIM 15, in response to which the SIM 15 calculates a reply and a key (dependent on the predetermined information held on the SIM—typically an authentication algorithm and a unique key Ki) and transmits the reply back to the mobile telecommunications network core 3. The mobile telecommunications network core 3 includes an authentication processor 17 which generates the challenge. Using information pre-stored concerning the content of the relevant SIM 15, the authentication processor 17 calculates the expected value of the reply from the mobile terminal 1 and the key. The authentication processor 17 sends the challenge, reply and key to the MME 7. The MME 7 sends the challenge to the mobile terminal 1. If the reply received by MME 7 matches the expected calculated reply, the SIM 15 and the associated mobile terminal 1 are considered to be authenticated. After the authentication process has been completed, the SIM 15 and MME 7 share a key which can be used to protect subsequent communications.

It should be understood that such an authentication process can be performed for any terminal provided with a SIM 15 under control of the mobile telecommunications network core 3. Although the terminal 1 may communicate wirelessly with the mobile telecommunications network core 3 via the network's radio access network, this is not essential. For example, the terminal may communicate with the network via the fixed telephone network (PSTN), via a UMA access point, via WLAN and/or via the Internet.

The SIM 15 used by the terminal 1, may be a SIM or USIM of the type similar to those defined in the 2G, 2.5G or 3G standards specifications, or may be a simulation of a SIM or USIM—that is, software or hardware that performs a function corresponding to that of the SIM or USIM. The SIM may be in accordance with the arrangement described in WO-A-2004 036513.

If a USIM is used the authentication process is enhanced to provide the capability for the terminal to authenticate the network and to have assurance about the freshness of the key established as a result of the authentication process. In addition authentication using a USIM can generally be used to establish longer keys than if a SIM were used.

Various embodiments of the invention will now be described in more detail.

"MME Selection"

In traditional 2G, 2.5G and 3G mobile telecommunications networks the RNC 107 is connected to only one SGSN 109. In 3GPP Release 5, Technical Specification 23.236, fully incorporated herein by reference, describes mechanisms that allow the RNC (in the case of 3G), or BSC (2G/2.5G) to connect to multiple SGSNs. However, there is little or no scope for the RNC or BSC to intelligently select a particular SGSN 109 for use with a particular terminal 101.

In contrast, and in accordance with an important feature of this aspect of the present invention, in the proposed SAE/LTE system, the terminal 1 can supply additional information to the eNodeB/AP 5, and the eNodeB/AP 5 can access one or more network servers to help intelligently select the MME 7. This can be particularly useful if the MME 7 and UPE 9 are in a combined gateway 8, because, then the selection of the MME determines the physical transmission path of the user data (which in turn has impacts on the user plane delay and transmission cost).

When mobile terminal 1 accesses eNodeB/access point 5, before a PDP context is allocated to the mobile terminal 1, the mobile terminal 1 provides the eNodeB/AP 5 with information to allow the network to select intelligently the most appropriate MME 7.

On receiving such an initial access from mobile terminal 1, the eNodeB/AP 5 contacts the "server for gateway selection" function 19 (FIG. 2). The eNodeB/AP 5 provides the server for gateway selection function 19 with the information provided by the mobile terminal 1. The diameter for gateway selection function 19 selects an appropriate MME 7 and returns the network address (for example, the IP address or FQDN of the MME 7) of the appropriate MME 7 to AP 5.

The allocation of a particular MME 7 (or Gateway 8 comprising MME 7 and UPE 9) to a particular mobile terminal 1 may be selected for any of the following (non-exhaustive list of) reasons:

To maintain low latency of the control signalling. This allows the time it takes for a control signal to be transmitted between the mobile terminal 1 and the selected MME 7 to be minimised.

To maintain low latency of the user plane data (e.g. if the MME 7 and UPE 9 are co-located in the same gateway 8). Low latency is useful for many internet applications which require many end to end message exchanges, and for obtaining high throughput from TCP/IP.

To provide more even (or appropriate) sharing of inbound Roaming users in a Shared radio access network (comprising AP/eNodeBs 5) scenario (based on the identity of each mobile terminal 1). For example in a Radio Access Network shared by operators X and Y, the "server for gateway selection" can be told that terminal 1 is from operator Z, and the "server for gateway selection" uses a rule (either pre-loaded, cached, or, obtained by real time enquiry to operator Z) to, for example, cause 80% of Z's inbound roamers to be connected to an MME of operator X and the other 20% of Z's inbound roamers to be connected to an MME of operator. Y.

To segregate subscribers of mobile virtual network operators (MVNOs) so that these use only a particular subset of MMEs 7.

To segregate Roaming subscribers so that they are registered with only one MME 7, in order to avoid the need to implement the roaming interfaces on all MMEs 7 (e.g. in 3G networks, the roaming interfaces are Gp (uses GTP) and Gr (uses MAP)). This may be particularly useful in avoiding the need to implement the MAP protocol on all MMEs.

If there are interoperability problems between some combinations of MME 7 and mobile terminals 1, then the "server for gateway selection" function 19 may select a particular MME 7 for registration of the particular mobile terminal 1 so that the respective devices are interoperable with one another. For example, the mobile terminal's IMEI may be used to identify the properties of the mobile terminal 1 from a look-up table in order that the "server for gateway selection" function 19 can determine with which MME 7 a particular mobile terminal 1 should be registered.

A specific MME 7 may be needed for a particular mobile terminal 1 if that mobile terminal 1 is associated with a corporate entity having a PABX because only some MMEs may interwork/interconnect with PABX's.

A mobile telecommunications network operator might use several different types of MME. For example, some MMEs may support all the functionality provided by the network, whereas other MMEs may support only a subset of that functionality. Some terminals will be able to make use of the full functionality provided by the network, whereas other terminals will not. The functionality of each terminal may be provided in a look up table associated with the IMEI of each particular terminal, or with the subscriber data of each particular mobile terminal. If this information is known to the "server for gateway selection" function 19, that function can select an MME for use with a particular terminal so that the functionality of the terminal is matched to the functionality of the MME.

A network operator may wish to register terminals used by VIPs on a particular MME or particular MMEs which have a higher resilience to failure or call dropping and have disaster recovery solutions implemented therefor.

The load on all the MMEs of a network may be distributed more evenly. That is, when a mobile terminal registers with the network, the MME is selected that has the most available capacity of all the MMEs.

In the case of a Gateway 8 comprising both MME 7 and UPE 9, The load on all the UPEs of a network may be distributed more evenly. That is, when a mobile terminal registers with the network, the Gateway 8 is selected that has the most available capacity of all the UPEs.

It may be desirable to take a particular MME 7 out of service. By operating the diameter for gateway selection function 19 to prevent any mobile terminals from registering with that MME, that MME can be taken out of service without disrupting the telecommunications services provided to any mobile terminals.

"IP Combining"

It is known in a 3G mobile telecommunications network to improve radio coverage provided to a mobile terminal 101 in a marginal coverage area by receiving data from that mobile terminal 101 at two (or more) nodeBs 105A, 105B (FIG. 1). That is, respective nodeBs 105A, 105B are operated to receive data transmitted from a single mobile terminal 101. Of course, what is actually received by each nodeB 105A, 105B may be different and will depend upon the radio conditions between the mobile terminal 101 and each nodeB 105A, 105B. The data from the nodeBs 105A, 105B are transmitted to an RNC 107, where it is combined to form a single data packet for onward transmission to the SGSN 109. The RNC 107 will analyse the data received from each nodeB 105A, 105B (which were duplicates when transmitted from the mobile terminal 101) and will form the data packet using parts of the data received from each nodeB 105A, 105B, these parts being selected so that the best quality data received from the nodeBs 105A, 105B is used. Thus, the data packet sent to the SGSN 109 may comprise some data received from a first nodeB 105A and some data received from a second node B 105B.

Such a "data packet" may be an Internet Protocol (IP) data packet. The data packet may be a collection of bits, with a clearly delimited beginning and end, generally with some addressing information (e.g. source and destination addresses), and frequently with a header field that contains some indication about the contents of the payload.

Such a known arrangement can significantly increase the quality of service provided in marginal coverage areas (such as at the edge of a cell In order for the RNC 107 to combine data received from respective eNodeBs 105A, 105B, tight synchronisation of transmission of data between the nodes is required.

In the 3G network architecture an RNC 107 may serve a multiplicity of nodeBs 105A, 105B. If data from the mobile terminal 101 are transmitted to two nodeBs 105A, 105B which are connected to the same RNC 107, then it is that RNC 107 that will perform the data combining described above. Data are transmitted from each nodeB 105A, 105B to the RNC 107 using the Iub Interface 104. This interface is often referred to as a "last mile" transmission link, and can be the most expensive data transmission link of the network to operate, being a wired (or wireless) connection between each nodeB 105A, 105B and the RNC 107 that is frequently rented from a third party.

The situation is complicated if the eNodeBs 105A, 105B to which a mobile terminal 101 is transmitting data are associated with different RNCs 107,107B. In such an arrangement one RNC 107 adopts the role of data combiner, with the other RNC 107B channelling data from their associated eNodeB 105B to the combining RNC 107 via the Iur Interface 118 between the respective RNCs 107,107B. Physically routing the data through RNC 107B adds delay As discussed above, in the proposed SAE/LTE architecture the equivalent nodes to the nodeB 105 and RNC 107 will be implemented as a single entity: as the eNodeB or AP 5. With such an arrangement, if combining were performed in a manner adopted for 3G telecommunications networks, the SAE/LTE equivalent of the Iur Interface would very frequently be used for data combining to be performed (because in SAE/LTE there is no equivalent to an RNC serving multiple nodeBs). This would result in a significant increase in the user data being sent on the "last mile" transmission and result in a significant operational cost increase.

Further, as mentioned above, in the 3G mobile telecommunications network the data received from respective nodeBs 105,105A,105B must be tightly synchronised so that they can be combined at an RNC 107 to form a single optimised data packet. This operation is complex. Furthermore, although the design of the system architecture within 3G telecommunications network is generally intended to be access agnostic, some radio technologies will require macro diversity combining to allow for efficient deployment. The macro diversity combining on other systems is at a radio layer, and therefore introduces some strong dependencies on the radio. In other words, in practice, the radio technology used to transmit data from the mobile terminal to each node B is required to be identical in 3G mobile telecommunications networks.

Figure 3:
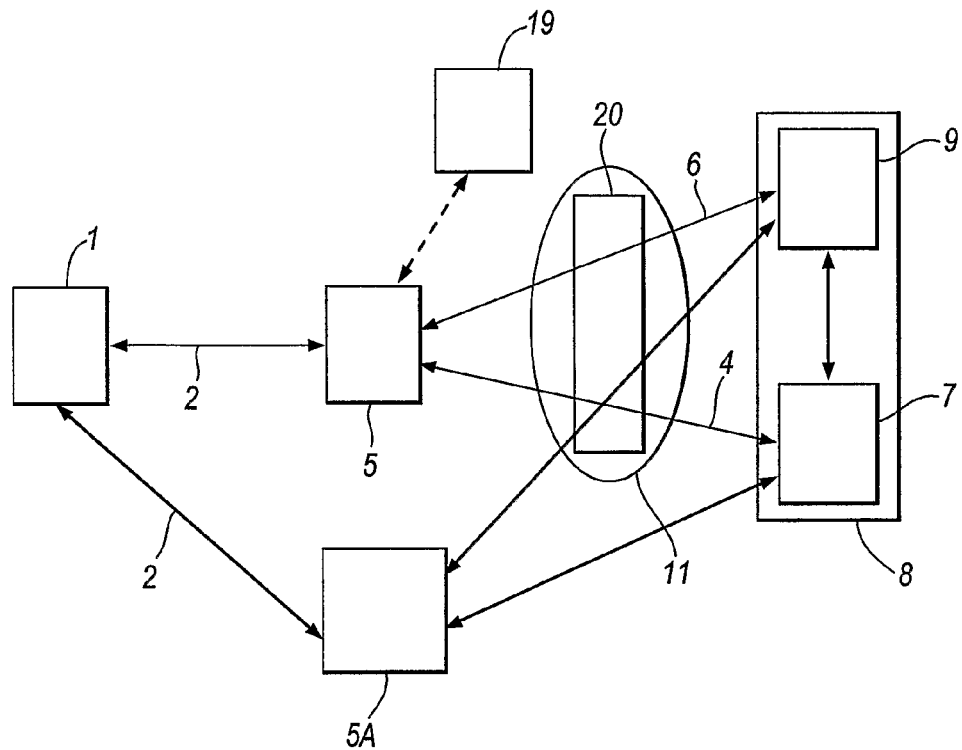
FIG. 3 shows the logical elements for SAE/LTE network which is modified to include an IP combiner in accordance with a second embodiment of the invention.

In accordance with the present embodiment the SAE/LTE architecture of FIG. 2 is modified as shown in FIG. 3 to include an IP combiner 20. The IP combiner 20 is provided in the uplink user plane and combines multiple data flows at the IP layer, and uses lower layer quality indications to maximise performance. The IP combiner 20 is operable to receive data from respective eNodeBs/APs 5,5A and to onwardly transmit this data to UPE 9 and MME 7.

At the time of SAE/LTE Radio Access Bearer (RAB) assignment (i.e. at the time of initial radio connection between the mobile terminal 1 and the MME 7) the MME 7 makes a decision based on the QoS required for the PDP context, whether the IP combiner 20 is required. If the QoS available is sufficient, then data will be transmitted simply from the mobile terminal 1 to the single most appropriate eNodeB 5 and from there directly to the allocated UPE 9. However, if the QoS data indicate that this will not provide sufficient quality, then a decision is made to receive data from the mobile terminal 1 at two (or more) eNode Bs/APs 5,5A.

If it is determined that IP combining is required, the relevant eNodeBs/APs 5,5A are instructed by the MME 7 to pass the uplink user plane data packets to the IP combining device 20. The MME 7 in parallel provisions the IP combining device 20 with the information required to map the connections from the eNodeBs/APs 5,5A to the connection which feeds the UPE 9.

In the embodiment, the data sent from each eNodeB/AP 5 to the IP combiner 20 are in the form of complete (whole) data packets. This is in contrast to the arrangement employed for 3G networks where parts of data packets are transmitted from respective nodeBs to a single combining RNC, where a single (whole) data packet is formed from a combination of the sequence of partial data packets received from two or more nodeBs. As only complete data packets are transmitted from the eNodeBs/APs 5,5A to the IP combiner 20 in the present embodiment, the tight synchronisation required for the 3G telecommunications network is no longer necessary.

When each eNode B 5 prepares an uplink data packet for transmission to the IP combiner 20 it includes an indication of the radio reception quality of the data packet as it is sent to the IP combining device 20. The IP combiner 20 should receive each data packet twice (one data packet from each of the two eNodeBs/APs 5,5A serving a single mobile terminal 1—assuming of course that only two eNodeBs/APs serve a single mobile terminal 1). The radio reception quality indication associated with each duplicated data packet is used to select which data packet should be discarded (the lower quality data packet is discarded). The better quality data packet is then passed from the IP combiner 20 to the MME 7.

In one embodiment of this invention, the quality indication is just an indication that the packet is "error free", or that it is "good quality", or that it is "worse than good quality".

In another embodiment of this invention, the eNodeBs do not send packets that are "worse than good quality" to the IP combiner 20.

Prior to a mobile terminal 1 registering with, or being handed over to, a new eNodeB (for example as it moves around the coverage area of the telecommunications network), the new eNodeB is informed by the currently serving eNodeB 5,5A of whether uplink combining is required and, if so, the new eNodeB is informed of the address of the IP combiner 20. The new eNodeB creates a connection to the IP combiner 20 and starts to pass any correctly received user plane traffic on that connection.

One embodiment of this invention is that it can be truly radio technology agnostic. Because complete data packets are transmitted between respective eNodeBs/APs and the IP combiner 20, the nature of the radio connection between the mobile terminal and the eNodeB/AP is not significant. For example, data may be transmitted from the mobile terminal 1 to one eNodeB/AP using a different radio technology, such as WLAN, to that used to transmit data from that mobile terminal 1 to another eNodeB/AP. Indeed, data may be transmitted from the mobile terminal 1 to an eNodeB/AP using a non-radio technology (e.g. by cable). The IP combiner 20 processes each data packet (and duplicates thereof) in the same way irrespective of the mechanism used to transmit them between the mobile terminal 1 and the eNode B/AP 5. Macro diversity combining is only necessary for some radio technologies. The present embodiment advantageously provides a simple architecture. Macro diversity combining is completed at the IP layer.

"Fast Click to View"

This embodiment relates to an arrangement for use with the proposed SAE/LTE telecommunications network that reduces the latency in establishment of the user plane bearer. Typically, in 3G networks the delay in establishment of the user plane bearer is between 300 and 500 ms. The present embodiment seeks to provide an arrangement where the delay is reduced to significantly less than 100 ms.

The current 3G system requires the mobile terminal to establish the control plane connection between the mobile terminal and the "control plane function" of the SGSN 109 (e.g. the equivalent of the MME 7 of the SAE/LTE telecommunications network) prior to the establishment of the user plane bearer based on a previously activated PDP context. The control plane has to be established prior to the user plane data flow because the RNC 107 requires the establishment of a Radio Access Bearer (RAB) which creates the user plane bearer between the RNC and the core network—in order to provide QoS information for the data flow as well as ciphering information to the RNC 107 (in order to authenticate the mobile terminal 101). These functions must occur before user plane data are allowed to be passed between the mobile terminal and the network. The establishment of the user plane bearer may take some time because each interaction with the control plane function of the SGSN 109 and between the SGSN 109 and the RNC 107 will take some time due to the processing delay in each node and the transmission delay of the interfaces between the nodes and the reconfiguration time of the radio node (RNC/nodeB).

Figure 4:
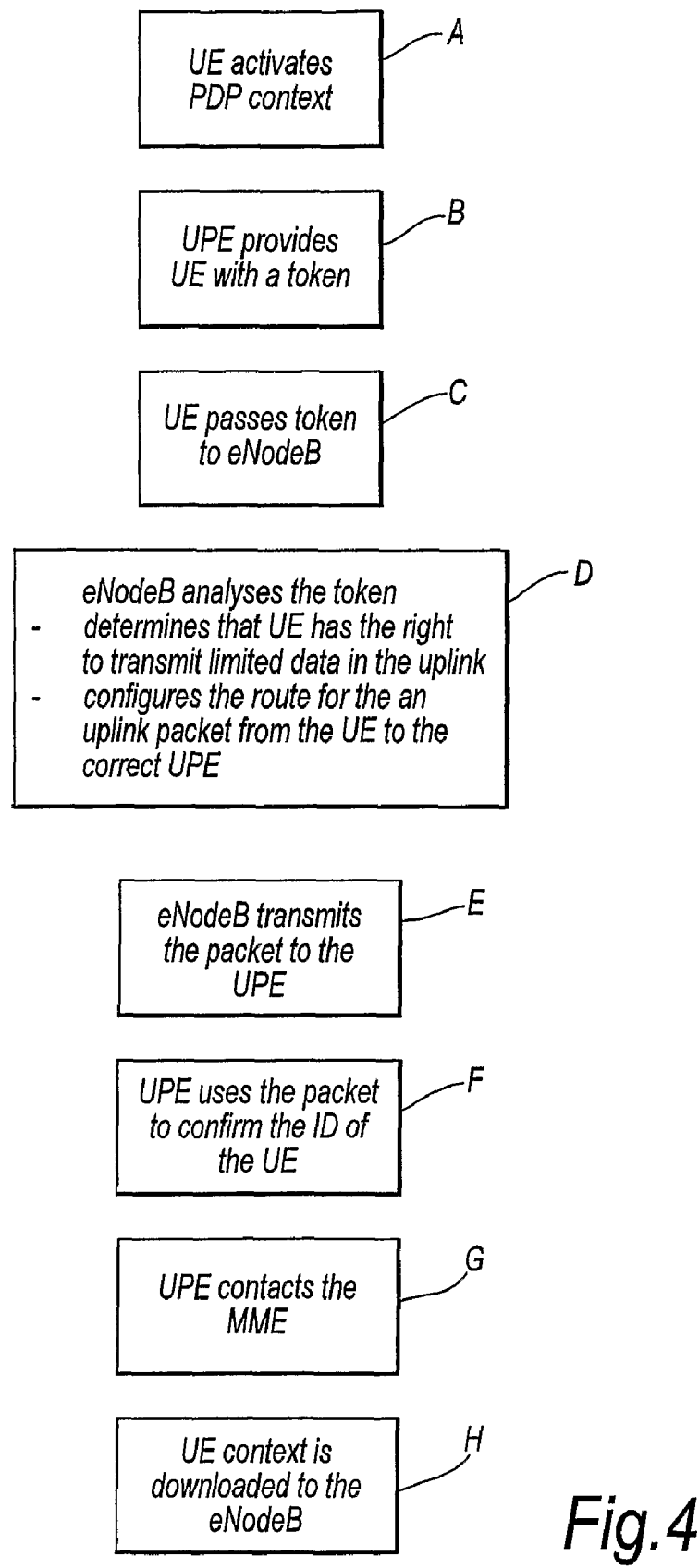
FIG. 4 is a flow chart showing the steps performed in accordance with a third embodiment of the invention which reduces the latency and establishment of the user plane bearer.

The embodiment will now be described with reference to the flow chart of FIG. 4.

When the mobile terminal 1 ("user entity"—UE) activates a PDP context (step A)—i.e. the negotiation of the user plane parameters—the mobile terminal 1/UE is provided with a configuration "token" for the context (step B) This token contains a sub-set of PDP context and UE context configuration information. At some later time, the terminal 1 may have returned to an idle mode and have moved into a new eNodeB's area. Then, when the mobile terminal 1/UE requires fast establishment of the user plane (step C), the token is passed to the eNodeB 5.

The token can be encoded in many ways. In one embodiment, the token would contain (or permit the derivation of) the IP address of the UPE 9 and the GTP Tunnel Endpoint ID that the UPE 9 has allocated for terminal 1.

The eNodeB 5 analyses the received token. The token is analysed with respect to pre-stored information provided to the eNodeB 5 (this pre-stored information need not be specific to that terminal, instead it could be common to all terminals registered with one MME or UPE, or common to all terminals registered on that network). If the token meets predetermined criteria, the eNodeB 5 can determine that the mobile terminal/UE has the right to transfer a small quantity of data in the uplink (prior to full conventional authentication of the UE with the core network 3). The token is also used by the eNodeB 5 to configure a route for an uplink data packet from the mobile terminal 1/UE to the appropriate UPE 9. The token also allows the uplink packet to be addressed such that the MME 7 can be informed (either by the eNodeB 5 or the UPE 9) as to which PDP context and mobile terminal 1/UE is now in use. The token may also enable the uplink packet to be encoded/encrypted. These operations are performed at step D.

In one embodiment of this invention, the "small quantity of data in the uplink" would be one complete IP packet. In some situations, this packet would be used to commence TCP/IP's Slow Start procedures, or, to perform a DNS look up—the rapid commencement of these procedures is important is providing an optimised user experience.

The eNodeB 5 transmits the uplink packet to the UPE 9 using address information derived from the token received from the terminal 1 (step E).

The UPE attempts to decipher/decode the uplink packet (step F). If the packet can be successfully deciphered/decoded, this indicates that the UE is genuine (i.e. it has a valid token). One means by which the UPE can ascertain that correct decoding has been achieved, is that, following decoding, the source IP address in the IP packet should match the IP address allocated to terminal 1.

Once the uplink packet is correctly decoded by the UPE 9, the UPE 9 contacts the MME 7 (step G) and the UE context is downloaded to the eNodeB 5 (step H), without requiring any dedicated control plane signalling between the mobile terminal/UE and the MME 7. As described above in relation to a 3G telecommunications network, such control plane signalling introduces delay into the user plane bearer establishment procedure. In the 3G telecommunications network the user plane is established through the control plane. The present embodiment establishes a control plane through the already established user plane.

The successful deciphering of the first uplink packet at the UPE 9 provides a preliminary authentication of the mobile terminal 1/UE. Thus, the user plane can be established prior to full authentication of the mobile terminal 1/UE with the MME 7. Full authentication of the mobile terminal 1/UE with the MME 7 may follow.

The MME 7 has a minor role in this embodiment. It passes UE context information to the eNodeB 5, when the UPE 9 informs the MME 7 that the user plane has successfully been established.

In the embodiment, essentially the token becomes a piece of information allowing the eNodeB to route the first uplink packet to the correct UPE, providing a UE identity which that UPE knows the UE and for which one of the previously activated PDP contexts these packets are associated. Then it is mainly the formatting of the 'token', and the use of a valid Identity combination which allows the eNodeB to understand whether this is a proper UE.

"Split Ciphering Architecture"

Figure 5:
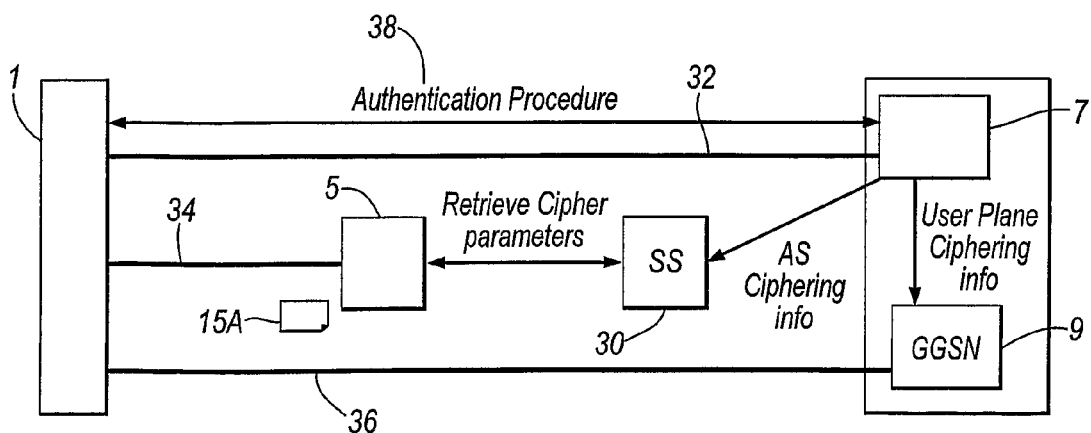
FIG. 5 shows the logical elements of a SAE/LTE mobile telecommunications network in accordance with a fourth embodiment of the invention, which includes additional security features.

FIG. 5 shows the SAE/LTE network architecture in which the MME 7 and the UPE 9 are combined as a single physical gateway (aGW 8). Additionally, a security store (SS) 30 is provided. The security store 30 may be co-located within the eNodeB/AP 5 but is preferably at a secure location within the network core (not shown separately in FIG. 5).

As discussed above, a more diverse range of access points (APs) for connecting to the core network are likely to be used with a SAE/LTE telecommunications network. For example, in addition to eNodeB 5, WLAN access points and the like are also likely to be used. For example, a user may have a WLAN access point in their home.

Because there is likely to be a larger number of access points, the access points are likely to be less complex and less secure than conventional base stations/nodeBs used in 2G, 2.5G and 3G networks. This problem is compounded by the access points being located in more hostile locations (such as users' homes). Any subscriber or security information stored on an access point needs to be carefully secured.

In accordance with an advantageous feature of this embodiment, some or all access points are associated with a smart card 15A. For example, the smart card may be embedded within the access point 5, may be removably coupled to the access point 5 or the access point 5 may contain hardware or software that simulates the functions performed by a smart card. The smart card 15A may operate in a similar manner to a 2G/2.5G or 3G SIM (subscriber identity module) or USIM. During the manufacturing process of the SIM 15A, authentication information is stored thereon under control of the telecommunications network. The telecommunications network itself stores in the security store 30 details of the SIM 15A issued under its control. For example, the SIM 15A may have stored thereon an authentication algorithm and a unique key K.

Each time the access point 5 is activated in the network (or at a predetermined time interval) the access point 5 is authenticated with the security store 30. This authentication may be performed by the security store 30 sending a challenge to the access point 5. The challenge is passed from the access point 5 to the SIM 15A. The SIM 15A calculates a reply and a key (dependent upon the predetermined information held on the SIM such as the authentication algorithm or the unique key K) and transmits the reply back to the security store 30. The security store 30 includes an authentication processor which generates the challenge and which receives the reply from the SIM 15A, sent by the access point 5. Using information pre-stored concerning the content of the SIM 15A, the authentication processor of the security store 30 calculates the expected value of the reply from the access point 5 (and SIM 15A). If the reply received matches the expected calculated reply, the SIM 15A and the associated access point 5 are considered to be authenticated. As will be appreciated by those skilled in the art, this challenge and response authentication process is analogous to the authentication process used for authenticating a SIM or USIM of a mobile terminal with a mobile telecommunications network in a 2G, 2.5G or 3G network. After the authentication process has been completed, the security store 30 may provide the access point 5 with updated security information (for example, details of mobile terminals that are known to be stolen or that have security weaknesses) and may configure the access point 5 to adopt particular configuration settings.

After the authentication process has been completed, the SIM 15A and security store 30 share a key which can be used to protect subsequent communications.

If a USIM is used the authentication process is enhanced to provide the capability for the access point to authenticate the network and to have assurance about the freshness of the key established as a result of the authentication process. In addition authentication using a USIM can generally be used to establish longer keys than if a SIM were used.

In the SAE/LTE architecture shown in FIG. 5 there are three separate ciphered links. These comprise a ciphered Non-Access Stratum (NAS) control plane 32 between the mobile terminal 1/UE and the MME 7, a ciphered Access Stratum (AS) control plane 34 between the mobile terminal 1/UE and the access point 5, and a ciphered user plane 36 between the mobile terminal 1/UE and the UPE 9.

The known 3GPP authentication procedure may be re-used in the SAE/LTE architecture shown, between the terminal 1/UE and the MME 7 at 38 (corresponding to the 3G SGSN 109). In the architecture shown, the authentication procedure may generate a master cipher key which is then used to derive cryptographically separate keys for each of the ciphered links 32,34 and 36 using a key derivation algorithm. The key derivation algorithm may ensure that knowledge of a key used to protect a particular link does not reveal any information about any of the keys used to protect other links. Integrity keys may also be generated and derived alongside the cipher keys. The integrity keys could be used to integrity protect each of the secured links. Integrity protection is likely to be provided on the control plane flows but less likely to be provided on the user plane flows. The ciphering keys for each of the secured links 32,34,36 are passed to the access point 5, MME 7 and UPE 9.

The mobile terminal 1/UE to MME 7 encryption in the control plane and the mobile terminal 1/UE to UPE 9 encryption in the user plane means that the security parameters do not have to be downloaded to the access point 5 to protect the user plane or the NAS control plane. Instead, the mobile terminal 1/UE can simply start sending/receiving encrypted user plane traffic as soon as it has camped on a particular access point 5

Advantageously, the access point 5 is provided with tamper resistance. For example, the access point 5 memory is reset when the access point 5 is opened/disturbed. Also, the subscriber information on the access point 5 may be deleted automatically if:

the IP connectivity of the access point 5 is lost. This could be achieved by using an O+M heart-beat from the network, to trigger the access point 5 to maintain the storage of the security/subscriber information periodically. If the O+M heart-beat is not received after a predetermined duration, the subscriber information is automatically deleted from the access point 5.

the power is lost to the access point 5.

The access point 5 may advantageously store a record of any disturbances or power losses. When the access point 5 is next authenticated with the network, the content of this store is used to generate a response to the authentication process in order to advise the security store 30 of the disturbance or the like.

If the access point 5 is not in a secure area, the IP link between the access point 5 and the network may be protected by firewalls.

As unsecure transmission links are likely to be used to connect access point 5 to the core network, the IP link between the access point 5 and the network may advantageously be protected using cryptographic techniques such as IPsec. A key derived from the previously described authentication procedure between the access point 5 and the network may be used to protect the IP link between the access point 5 and the network using cryptographic techniques such as IKE/IPsec.

The headings used in this description shall have no effect on the meaning to be given to any part of the description.

The invention claimed is:

1. A mobile telecommunications network comprising:
first and second access points;
a network gateway device;
a network core; and
a telecommunications device registered with the network, the telecommunications device being configured to communicate within the network core via the first and second access points and the network gateway device;
wherein the network is operable:
to establish a first user plane connection between the telecommunications device and the network gateway device via the first access point, such that during establishment of the first user plane connection, the telecommunications device is provided with a token;
to establish a second user plane connection between the telecommunications device and the network gateway device via the second access point by passing the token from the telecommunications device to the second access point, the token comprising data indicating to the network that the telecommunications device has authorization to send a quantity of data to the network gateway device prior to full conventional authentication of the telecommunications device; and
to establish a control plane connection corresponding to the second user plane connection and subsequent to establishment of the second user plane connection.

2. The network of claim 1, wherein said token comprises data indicative of the identity of the telecommunications device.

3. The network of claim 1, wherein said token comprises data indicative of the network gateway device.

4. The network of claim 1, wherein said token is indicative of the authority of the telecommunications device to establish the second user plane connection.

5. The network of claim 1, wherein the token comprises data relating to the signalling path from the telecommunications device towards the network core.

6. The network of claim 1, wherein the token comprises encoding/encryption data.

7. The network of claim 1, wherein the quantity of data the telecommunications device is authorized to send by the token comprises an uplink data packet.

8. A method of operating a mobile telecommunications network, the mobile telecommunications network comprising first and second access points, a network gateway device, a network core, and a telecommunications device, the telecommunications device being registered with the network and communicable within the network core via the first and second access points and the network gateway device, the method comprising:
establishing a first user plane connection between the telecommunications device and the network gateway device via the first access point;
providing the telecommunications device with a token using the first user plane connection, the token comprising information indicative to the network that the telecommunications device has authorization to send a quantity of data to the network gateway device prior to full conventional authentication of the telecommunications device;
establishing a second user plane connection between the telecommunications device and the network gateway device via the second access point by using the token information to validate the telecommunications device; and
establishing a control plane connection between the telecommunications device and the network gateway device via the second access point, the control plane connection corresponding to the second user plane connection and being established subsequent to establishment of the second user plane connection.

9. The method of claim 8, wherein establishing the second user plane connection comprises:
passing the token from the telecommunications device to the second access point; and determining, by the second access point, that based on the token information, the telecommunications device has authorization to send a quantity of data to the network gateway device prior to full conventional authentication of the telecommunication device.

10. The method of claim 8, further comprising sending, by the telecommunications device, an uplink data packet to the second access point using the second user plane connection.

* * * * *